Patented July 6, 1926.

1,591,725

UNITED STATES PATENT OFFICE.

RUSSELL W. MUMFORD, OF TRONA, CALIFORNIA, ASSIGNOR TO AMERICAN TRONA CORPORATION, OF NEW YORK, N. Y., A CORPORATION OF DELAWARE.

EVAPORATION OF BRINES.

No Drawing.   Application filed August 15, 1922.   Serial No. 582,052.

This invention relates to improvements in methods of evaporating and otherwise handling brines which have a normal tendency to foam, and more particularly it relates to improvements in the prevention or reduction of the foaming of such brines during evaporation.

The invention is of more or less general application to saline brines but it is of special application and value in connection with the brines obtained from Searles Lake in California and similar brines.

The Searles Lake brines, for example, are strongly concentrated or saturated solutions containing chiefly the following salts in solution, namely, sodium chloride, potassium chloride, sodium carbonate, sodium bicarbonate, sodium borate, sodium metaborate and sodium sulphate. I use the term "brine" to designate not only the original salt-containing solutions, but also the solutions containing variable amounts of inorganic salts which are obtained during concentration and other treatment of such brines for the separation and recovery of their constituents.

These brines, either hot or cold, foam strongly when agitated, and it has heretofore been difficult to concentrate these brines in evaporating pans, for the separation and recovery by crystallization of a part or all of their inorganic salt contents, because of their foaming properties which result or tend to result in the loss of valuable salts, contamination of the condensate, and greatly reduced capacity of the evaporators. Similar difficulties from foaming have likewise been encountered during agitation of these brines, by air or otherwise, in other necessary steps of the recovery process, as for example during crystallization of borax from solution.

These difficulties can only in part be avoided by means of special mechanical equipment which is, moreover, expensive and not always efficient.

The present invention is based upon the discovery that the objectionable foaming propensities of such brines can be prevented or greatly reduced by adding to them, and having present therein during their evaporation or agitation, certain foam-reducing or foam-preventing substances of a character hereinafter more particularly indicated; and that when such substances are present in suitable amount the difficulties due to foaming are so greatly reduced, or prevented, that the evaporation or other process may be carried out with added advantages, certain of which are hereinafter described.

My investigations of the Searles Lake brine indicate that its excessive foaming tendency is not an inherent property of the brine itself (meaning the solution of various inorganic salts) for synthetic brines of a composition substantially identical with that of the Searles Lake brine, so far as the inorganic salt composition is concerned, do not foam in like degree to the Searles Lake brine itself. My investigations indicate that the excessive foaming tendency of the brine is chiefly due to organic matter, presumably that which is washed into the brine of the lake from the surrounding water-shed. The nearby vegetation contains, for example, saponins and resins which, when experimentally added, even in very small quantity to a synthetic brine, cause it to exhibit marked foaming properties; and it is presumably due to organic matter of this or similar character that the brine possesses its excessive foaming tendency. The organic matter as found in the lake brine appears to be of a complex character and to be made up of many chemically distinct substances, some of which are found in the vegetation of the water-shed, but most of which are probably decomposition products derived therefrom. The amount of such organic matter present in the brine is variable but small and is usually only a small fraction of 1%. The combined effect of the organic substances, however, is to cause a foam having remarkable volume and persistence and which has the objections and presents the difficulties such as those mentioned above. Although such foam is primarily due to the presence of organic matter, the amount of foam is variable and may sometimes be greatly increased due to the varying chemical and physical characteristics of the brine.

The organic matter of the brine appears to be very largely in a colloidal condition and to cause the foaming by its effect on the surface tension and surface viscosity of the brine.

According to the present invention, the objectionable foaming propensities of the brines are modified or destroyed by the use of foam-reducing or foam-preventing agents which are added to the brine and are present therein during the operations where excessive foaming would be objectionable, such as the vacuum evaporation of the brine.

The foam-reducing or foam-preventing agents which are thus added, according to the present invention, may vary somewhat in character. Those which I have found particularly valuable and advantageous are substances such as the soaps of the fatty acid series which are themselves substances of a colloidal nature or which form colloidal solutions and which cause a decrease in the surface tension of the liquids in which they are dissolved, together with other accompanying effects on the surface condition in these brines. When added in suitable amount to the foaming brines, such as Searles Lake brines, they act in such a way that the foaming can, in many cases, be entirely prevented and, in all cases, greatly reduced. When such agents are present in suitable amount it is possible to handle and concentrate the brines, for example, without meeting the serious difficulties, due to foaming which have heretofore been encountered.

Many different substances, such as certain higher alcohols, soluble oils (e. g. Turkey red oil), etc., can be used with greater or less effectiveness, but the foam-preventing agents which I have found to be particularly advantageous are soaps, that is, alkali salts of higher fatty acids, such as oleic acid, stearic acid and the like, and the free fatty acids themselves which, on addition to the hot alkaline brine, form soaps with the alkaline compounds thereof.

While I do not wish to limit myself by any theoretical explanation of the action of the foam-preventing substances, nevertheless, the apparent action of these substances is to displace from the surface layer of the brine or foaming solution the foam causing materials, thereby preventing their objectionable action, while at the same time the foam-preventing agent is present in too low a concentration, or under such adverse conditions, that it cannot of itself cause foam. As a result, the normally foaming brine behaves very much as if neither the foam-causing materials nor the foam-preventing materials were present, so that it can be handled and concentrated without difficulty. It is difficult to secure a complete understanding of the behavior of colloidal materials with complex solutions of the character with which the present invention is concerned, and it may be that many different factors play a part in the result obtained. Nevertheless, the effect of adding the foam-preventing agent or agents to the foaming liquid is substantially that which has been described.

In the evaporation of saturated or concentrated salt solutions, such as Searles Lake brine, a considerable amount of finely divided solid material is separated out during the evaporation and, unless removed, would increase in amount with the progressive concentration. Such finely divided solids in suspension, when present in accumulated amounts, greatly increase the stability and persistence of the foam and give added difficulty in the evaporation of foaming brines. This is particularly true of fine crystals with bright lustrous faces such as are formed, for example, during the concentration of the Searles Lake brine.

According to the present invention, and particularly when the evaporation of the brines is carried out in multiple effect evaporators, with progressive separation from solution of such finely divided salts, the salts are removed during the progress of the evaporation. I have found that the effectiveness of the foam-reducing and foam-preventing agents is greatly increased by removing such finely divided materials as rapidly and completely as possible from suspension in the brine. I have also found that the amounts of such agents required for reducing or preventing the objectionable foaming of the brine can be considerably reduced when the finely divided materials are thus removed.

In actual practise I have obtained the most efficient and satisfactory results by using, as foam-preventing agents, soaps of the fatty acid series. These may be added directly to the foaming liquid, either as such or previously dissolved in water, or in the case of alkaline brines the fatty acids themselves may be added and will form soap by saponification in the brine. The amount to be added can be varied and will depend somewhat both on the amount and nature of foam-causing material present in the brine. When the precipitated salts are decreased by removal during concentration, the amount necessary will be lessened and the effectiveness increased by such removal.

In the commercial evaporation of brines having foaming propensities, such as the Searles Lake brines, the brine is commonly evaporated in multiple effect evaporators, and the present invention is particularly adapted for use in such multiple effect evaporation, for example, in a triple effect evaporator with each effect having a capacity of about 30,000 gallons. With an evaporator of this character the improved foam prevention treatment of the present invention enables a rate of evaporation to be obtained which will run upwards of 20,000 gallons per hour, or 3,000,000 gallons per week, and which will be greatly increased over the amount attainable in such evaporators without such foam prevention or reduction treatment.

In the evaporation of Searles Lake brine, varying amounts of the foam-reducing agents can be used, but for commercial operations I have found that the amount required will usually lie between 1 and 50 parts of soap, for instance, per million parts of brine. There is a slight constant loss of soap due to precipitation and occlusion by the inorganic salts, and, to make up for this loss, further amounts of soap or fatty acid should be added during the operation of the evaporators.

For best results it is important to add the soap or fatty acid slowly and continuously, or at short intervals, since the effectiveness of any single addition steadily diminished, probably through elimination from the brine through coagulation and precipitation with the crystallized salts.

In the attainment of best results it is also important to remove crystallized salts from suspension in the brine as completely and rapidly as possible, in order that they may not exert a stabilizing effect on such reduced amounts of foam as may be formed. One method of removing these salts which I have found to be effective is to include as part of a closed circulatory system with each evaporator pan a salt trap, or settling tank. The brine, containing suspended salts, is continuously drawn off from the bottom of the evaporator pan, passed through the salt trap where, because of slow rate of flow and lack of ebullition, the solid salts are deposited, and the clear brine then returned to the evaporator. By providing two traps for each evaporator pan, which traps are used alternately, and from which the deposited salts are removed in alternation, it is possible to maintain the evaporator pans in continuous operation.

Where the foam preventing agents are solid in character, for example, in the case of fatty acids which are solid or semi-solid at ordinary temperatures, they may be stored in a small steam heated tank to make them fluid and they may then be run from a manifold through separate regulating valves and sight-glasses to the three evaporator pans of the triple effect evaporator. The feed lines may themselves be steam heated or steam jacketed to keep the soap or fatty acid liquid in cold weather. The fatty acid or soap is advantageously added to the evaporators close to the points at which the brine is introduced and it is preferably added on the surface of the brine, although it can be added beneath the surface. By supplying the soaps or fatty acids in the manner above indicated, the amount fed to each effect of the multiple effect evaporator can be readily regulated and increased or decreased to obtain the desired foam reduction.

The improved foam preventing process of the present invention is applicable not only to the raw brine and to the evaporated brine, resulting from the evaporation of the raw brine in multiple effect evaporators, but it is also applicable to solutions of products obtained from the brine, such as solutions of borax which are undergoing cooling and with which a vacuum may be employed to promote the cooling and crystallization. That is, a small amount of the soap or fatty acid may be added to prevent or reduce foaming in conjunction with vacuum cooling of solutions having objectionable foaming propensities. Other brines and salt solutions, such as sodium chloride brines containing varying amounts of other salts and which have objectionable foaming propensities can be similarly treated.

I claim:

1. The improvement in the evaporation of brines containing compounds which induce foaming which comprises preventing or reducing the foaming of the brine during concentration by carrying out the evaporation in the presence of a foam-preventing non-volatile emulsion colloid.

2. The improvement in the prevention of foaming in the evaporation of alkaline brines containing emulsion colloids, which comprises carrying out the evaporation with the addition of a fatty acid.

3. The improvement in the prevention of foaming in the multiple effect evaporation of alkaline brines which comprises adding to the brine undergoing concentration a fatty acid.

4. The improvement in the prevention of foaming in the multiple effect evaporation of alkaline brines, which comprises adding to the brine undergoing concentration a fatty acid, such additions being effected continuously throughout the evaporation.

5. The improvement in the progressive evaporation of brines containing compounds which induce foaming which comprises evaporating the brine with the addition of foam-reducing agents and removing from the brine during evaporation finely divided solid salts separated out during the evaporation.

6. The improvement in the multiple effect evaporation of brines which comprises adding to the brine undergoing concentration a fatty acid compound, such additions being effected continuously throughout the evaporation and continuously removing finely divided solids from the brine during evaporation.

7. The improvement in the multiple effect evaporation of alkaline brines which comprises adding to the brine undergoing concentration a fatty acid, such additions being effected continuously throughout the evaporation and continuously removing finely divided solids from the brine during evaporation.

8. The improvement in the prevention of foaming during the concentration of Searles Lake brine containing emulsion colloids, which comprises carrying out the evaporation with the addition of other non-volatile emulsion colloids which neutralize or prevent the foaming action of those normally present in the brine.

9. The improvement in the prevention of foaming in the evaporation of Searles Lake brine which comprises carrying out the evaporation with the addition of a fatty acid.

10. The improvement in the multiple effect evaporation of Searles Lake brine which comprises adding to the brine undergoing concentration a fatty acid.

11. The improvement in the multiple effect evaporation of Searles Lake brine which comprises adding to the brine undergoing concentration a fatty acid, such additions being effected continuously throughout the evaporation.

12. The improvement in the progressive evaporation of Searles Lake brine which comprises evaporating the brine with the addition of foam reducing agents and removing from the brine during evaporation finely divided solid salts separated out during the evaporation.

13. The improvement in the multiple effect evaporation of Searles Lake brine which comprises adding to the brine undergoing concentration a fatty acid compound, such additions being effected continuously throughout the evaporation and continuously removing finely divided solids from the brine during evaporation.

14. The improvement in the multiple effect evaporation of Searles Lake brine which comprises adding to the brine undergoing concentration a fatty acid, such additions being effected continuously throughout the evaporation and continuously removing finely divided solids from the brine during evaporation.

15. The improvement in the prevention of foaming in the evaporation of brine containing emulsion colloids, which comprises carrying out the evaporation in the presence of a soap.

16. The improvement in the multiple effect evaporation of brines which comprises carrying out the progressive evaporation in the presence of a soap.

17. The improvement in the multiple effect evaporation of brines which comprises carrying out the progressive evaporation in the presence of a soap, and continuously removing finely divided solids from the brine during evaporation.

18. The improvement in the prevention of foaming in the evaporation of Searles Lake brine which comprises carrying out the evaporation in the presence of a soap.

19. The improvement in the multiple effect evaporation of Searles Lake brine which comprises carrying out the progressive evaporation in the presence of a soap.

20. The improvement in the multiple effect evaporation of Searles Lake brine which comprises carrying out the progressive evaporation in the presence of a soap, and continuously removing finely divided solids from the brine during evaporation.

21. The improvement in the prevention of foaming during agitation of alkaline solutions containing compounds which induce foaming which comprises adding thereto a fatty acid.

22. The improvement in the prevention of foaming during agitation of solutions containing compounds which induce foaming which comprises adding thereto a fatty acid compound.

23. The improvement in the prevention of foaming during agitation of solutions containing compounds which induce foaming which comprises carrying out the agitation in the presence of a soap.

In testimony whereof I affix my signature.

RUSSELL W. MUMFORD.